(12) United States Patent
Kataoka et al.

(10) Patent No.: US 6,546,556 B1
(45) Date of Patent: Apr. 8, 2003

(54) VIDEO CLIP IDENTIFICATION SYSTEM UNUSABLE FOR COMMERCIAL CUTTING

(75) Inventors: Mitsuteru Kataoka, Fujisawa (JP); Kazuhiro Machida, Inzai (JP); Takenosuke Harada, Yokohama (JP)

(73) Assignees: Matsushita Electric Industrial Co., Ltd., Osaka (JP); Information Broadcasting Laboratories, Inc., Tokyo (JP)

(*) Notice: Subject to any disclaimer, the term of this patent is extended or adjusted under 35 U.S.C. 154(b) by 0 days.

(21) Appl. No.: 09/220,887

(22) Filed: Dec. 28, 1998

(30) Foreign Application Priority Data

Dec. 26, 1997 (JP) ............................................. 9-368938
Dec. 26, 1997 (JP) ............................................. 9-368939

(51) Int. Cl.⁷ .......................... H04N 7/025; H04N 7/00; H04N 5/91; H04N 7/08
(52) U.S. Cl. ............................. 725/35; 725/34; 725/35; 348/465; 348/907; 358/908; 386/94; 386/95
(58) Field of Search ............................ 725/34, 35, 93, 725/88, 102; 348/465, 907; 358/908; 386/94, 95

(56) References Cited

U.S. PATENT DOCUMENTS

| | | | | |
|---|---|---|---|---|
| 5,600,364 A | * | 2/1997 | Hendricks et al. | 348/1 |
| 6,002,393 A | * | 12/1999 | Hite et al. | 345/327 |
| 6,173,271 B1 | * | 1/2001 | Goodman et al. | 705/40 |
| 6,304,715 B1 | * | 10/2001 | Abecassis | 386/68 |

FOREIGN PATENT DOCUMENTS

| | | |
|---|---|---|
| EP | 0580227 | 1/1994 |
| EP | 0720369 | 7/1996 |
| WO | WO 9749241 | 12/1997 |

* cited by examiner

Primary Examiner—Andrew Faile
Assistant Examiner—Son P. Huynh
(74) Attorney, Agent, or Firm—Lowe Hauptman Gilman & Berner, LLP (57) ABSTRACT

A tagged scene of a video stream transmitted from a first to second stations in television broadcasting system is collected while preventing the tags from being used for commercial cutting (i.e., indiscriminate tagged scene cutting). The first station generates for each scene a tag includes a category, a location for use in locating a beginning of the scene and a length. A second station obtains a desired category from the user. Detecting a tag in the video stream, if the category coincides with the desired category, the second station clips from the video stream a part of the length defined in the tag from a position located by using the location. Five solutions are disclosed: removing the length information from tag; inserting counterfeit tags: the first station encoding a part of tag and the second station decoding the encoded part; the first station encoding the category and sending a category-encoded category table the second station; and a syndrome of a combination of said category and a parameter is used as an encoded category. The parameter may be used as subcategory and/or supercategory.

25 Claims, 8 Drawing Sheets

AN EXEMPLARY COUNTERFEIT TAG

FIG. 9

OPERATION OF THE COMPUTER 24

| CATEGORY (Cj) | ENCODED CATEGORY (f(Cj)) |
|---|---|
| CAR | NC0iS3J |
| CAMERA | LAv0U3M |
| COSMETIC | Lg9LDEy |
| . . . | . . . |

FIG. 13

OPERATION OF THE COMPUTER 24

START → CREATE THE CATEGORY-CODED CATEGORY TABLE 440 BY CODING EACH CATEGORY THROUGH THE ONE WAY FUNCTION f (450) → SEND THE TABLE 440 TO THE TV RECEIVER 4 (451) → END

FIG. 14

START → ENCODE THE CATEGORY FIELD 11 OF THE CREATED TAG WITH THE ONE-WAY FUNCTION f (455) → ATTACHE THE TAG TO THE PROGRAM ACCORDING TO THE LOCATION 12 VALUE (456) → END

FIG. 15

START → OBTAIN AN ENCODED CATEGORY ASSOCIATED WITH THE SPECIFIED KEY WORD FROM THE TABLE 440 (455) → PASS THE OBTAINED ENCODED CATEGORY TO THE VIDEO STREAM PROCESSOR 42 (456) → END

FIG. 16

| CATEGORY (Cj) | ENCODED CATEGORY ( $s(Cj)=X^TH$ ) |
|---|---|

| SCENE ID | |
|---|---|
| ENCRYPTED CATEGORY ($s(Cj)=X^TH$) | |
| LOCATION (Di or Ti) | |
| LENGTH (Li) | |
| ⋮ | |

| CATEGORY (Cj) | ENCODED CATEGORY ( $s(Cj)=X^TH$ ) |
|---|---|
| CAR | $\{SEDAN\}^TH_{CAR}$, $\{WAGON\}^TH_{CAR}$, $\{OUTDOOR\}^TH_{CAR}$ |
| CAMERA | $\{NICON\}^TH_{CAMERA}$, $\{CANON\}^TH_{CAMERA}$, $\{KOTAK\}^TH_{CAMERA}$ |
| SPORTING | $\{WARE\}^TH_{SPORTING}$, $\{OUTDOOR\}^TH_{SPORTING}$ |
| . . . | . . . |

FIG. 19

| OUTDOOR | CAR, SPORTING, . . . . |
|---|---|

| CATEGORY (Cj) | SUBCATEGORY (X) | $X^TH$ |
|---|---|---|
| CAR | SEDAN | $\{SEDAN\}^TH_{CAR}$ |
| | WAGON | $\{WAGON\}^TH_{CAR}$ |
| | . . . | |
| CAMERA | NICON | $\{NICON\}^TH_{CAMERA}$ |
| | CANON | $\{CANON\}^TH_{CAMERA}$ |
| | KOTAK | $\{KOTAK\}^TH_{CAMERA}$ |
| | . . . | . . . |

VIDEO CLIP IDENTIFICATION SYSTEM UNUSABLE FOR COMMERCIAL CUTTING

BACKGROUND OF THE INVENTION

1. Field of the Invention

The invention generally relates to a television system and more particularly to a system for and method of identifying a part (clip) of a video stream, the system and method being difficult to use for a commercial cutting function. The system and the method is applicable to a television system that permits the user to collect a variety of video clips such as program previews, commercials, representative scenes of a program and so on.

2. Description of the Prior Art

Recently, television (TV) broadcasting systems have increased channels in number. This often causes the user to find a difficulty in selecting programs to watch. In order to facilitate the selection of programs, broadcasting parties deliver program presentation scenes, program previews and so on between programs. Engineers of next generation broadcasting system are examining video environment in which the receiver automatically stores incoming program presentation scenes so as to enable the user to select programs meeting the user's taste without suffering from a flood of information. These environments will permit the user to search the stored program presentation scenes for favorite programs. In these environments, a television receiver can automatically record a highlight scene in each program, permitting the user to find a program he or she want by searching the recorded scenes. Also, if the user likes automobiles for example, he or she can control the television receiver to automatically accumulate commercials of automobiles to form a visual catalogue of automobiles.

The receiver automatically accumulating only particular programs or particular scenes is achieved by the broadcasting side attaching identifying codes to broadcast programs and scenes and by the receiver identifying desired programs and scenes through the identifying codes. Specifically, the broadcasting side attaches tags to parts of a transmitted video stream such as e.g., program presentation scenes, commercials and program previews (i.e., includes in the transmitted video stream a tag or data set for each video part spacing a predetermined fixed period or a period specified in the tag after the video part). This enables the receiver to identify the video part by using associated tags, permitting the receiver to accumulate desired ones of the tagged scenes.

However, these tags also permit the receiver to easily remove or cut commercials and program presentation scenes inserted in the program in itself (commercial cutting). This is vary disadvantageous for the sponsors to the program.

It is an object of the invention to provide techniques for collecting desired parts or scenes of a video stream by attaching a tag to each of the desired parts so as to prevent the tags from being used for commercial cutting (or information deletion, from the video stream, based on the tags associated with the commercial scenes).

SUMMARY OF THE INVENTION

According to the principles of the invention, a method of and system for collecting a tagged scene of a video stream transmitted from a first station to second stations in television broadcasting system while preventing tags from being used for commercial cutting (i.e., indiscriminate tagged scene cutting) is provided. The first station generates a tag for the scene. The tag includes a category of the scene, a location for use in locating a beginning of the scene and a length of the scene. The first station makes an arrangement to prevent the tag from being used for commercial cutting; and insert the tag in the video stream at the position located by using the location.

The location in time may be either an interval between the insertion of the tag and the transmission of the scene or a relative time with respect to a reference time. The location may be a fixed period.

A second station obtains a desired category from the user; detects a tag in the video stream; makes a test to see if the category coincides with the desired category; and if so, clipping from the video stream a part of a length defined by the length of the scene from a position located by using the location in such manner as accords with the arrangement.

In a first embodiment, the length information is removed from the tag. In this case, the second station clips a largest one of a plurality of standardized lengths.

In a second embodiment one or more counterfeit tag is inserted in the video stream. The counterfeit tags includes false data.

In a third, the first station encodes one of the category, the location and the length through a one-way function and uses the encoded one in place of the original one. The second station decodes the encoded one into a decoded one and uses the decoded one.

In a fourth embodiment, for each of possible categories the first station further sends a set of the category and the encoded category to the second stations before inserting the tag. The second station receives the sets from the first station; and if the category of the detected tag coincides with the encoded category associated by the set with the desired category, clips the above-mentioned part from the video stream.

In a fifth embodiment, a syndrome of a combination of the category and a parameter is used as the encoded category. In the first station, a list of subcategories is made for a desired one of possible categories; a syndrome for a combination of the desired category and each of the subcategories is calculated by using each of the subcategories as the parameter; a table of the category, the subcategories, and corresponding syndromes is sent to the second stations. The second station stores the received table and uses the syndromes as the encoded categories and the subcategories as the categories.

Also, the first station may create a super-category comprising a list of categories; find a syndrome for a combination of the super-category and each of the categories of the list by using each of the categories of the list as the parameter; send the list for the super-category to the second stations; and use the syndromes as the encoded categories.

BRIEF DESCRIPTION OF THE DRAWING

The features and advantages of the present invention will be apparent from the following description of an exemplary embodiment of the invention and the accompanying drawing, in which.

Throughout the drawing, the same elements when shown in more than one figure are designated by the same reference numerals.

DETAILED DESCRIPTION OF THE PREFERRED EMBODIMENTS

Figure 1:
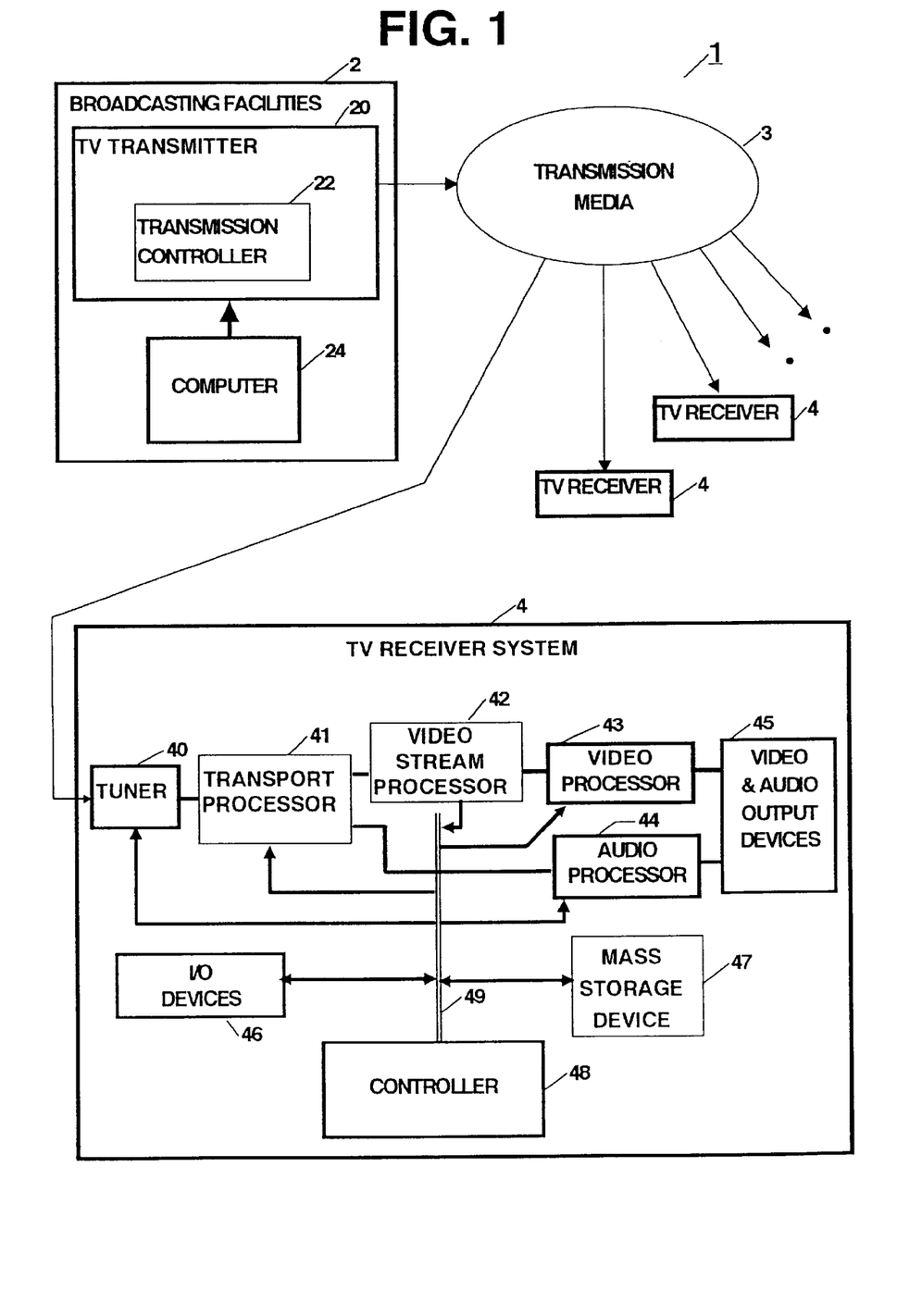
FIG. 1 is a diagram showing a television (TV) broadcasting network or system which has incorporated a system for collecting desired video scenes or clips in accordance with the principles of the invention.

FIG. 1 is a diagram showing a television (TV) broadcasting network or system which has incorporated a system for collecting desired video scenes or clips in accordance with the principles of the invention. In FIG. 1, the TV broadcasting network 1 comprises broadcasting facilities 2 for transmitting a broadcast stream including a video stream, a transmission media 3 through which the broadcast stream is delivered, and a multiplicity of TV receiver systems (or systems incorporating a TV tuner) 4.

The broadcasting facilities 2 comprises a TV transmitter 20 and a video-editing computer 24 that permits the operator to enter additional information (e.g., tags) to be included in a completed TV program (or a TV program which has been edited and compiled with commercials of the sponsors to the TV program and which is ready for transmission). The TV transmitter 20 includes a transmission controller 22 for controlling the TV transmitter 20.

On the other hand, the TV receiver systems 4 at least comprises a tuner 40 for selecting a specified one of the received channels; a transport processor 41 for IF (intermediate frequency) processing and demodulating the output signal from the tuner 40 into a video stream and an audio stream; a video stream processor 42 for extracting the additional information in the video stream from the transport processor 41 and for extracting or clipping a specified video scene (specified by a tag included in the additional information) from the video stream; I/O devices 46 for permitting the user to enter a command and data for the TV receiver system; a mass storage device 47 for storing collected video scenes (or clips); and controller for controlling the above-mentioned elements 40 through 42, 46 and 47. The mass storage device 47 may be a hard disc device or a rewritable optical disc device. If the TV receiver system 4 is a TV receiver, the system 4 further comprises a video processor 43 for providing a video output signal; an audio processor 44 for providing an audio output signal; and video and audio output devices. Bus lines 49 interconnect the elements 40 through 44, and 46 through 48.

It is noted that the transmission media 3 may be a terrestrial or satellite radio wave and/or cables. Also, the TV receiver system 4 may be any system having a TV tuner: e.g., a TV set, a video tape or cassette recorder, a rewritable optical disc, various kinds of set-top boxes, a computer with a tuner, other various information and/or communication system, etc.

Basic Concept of the Invention

Figure 2:
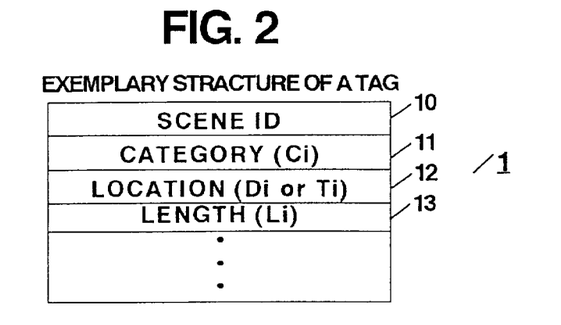
FIG. 2 is a diagram showing an exemplary structure of a tag inserted in the video stream.
Figure 3:
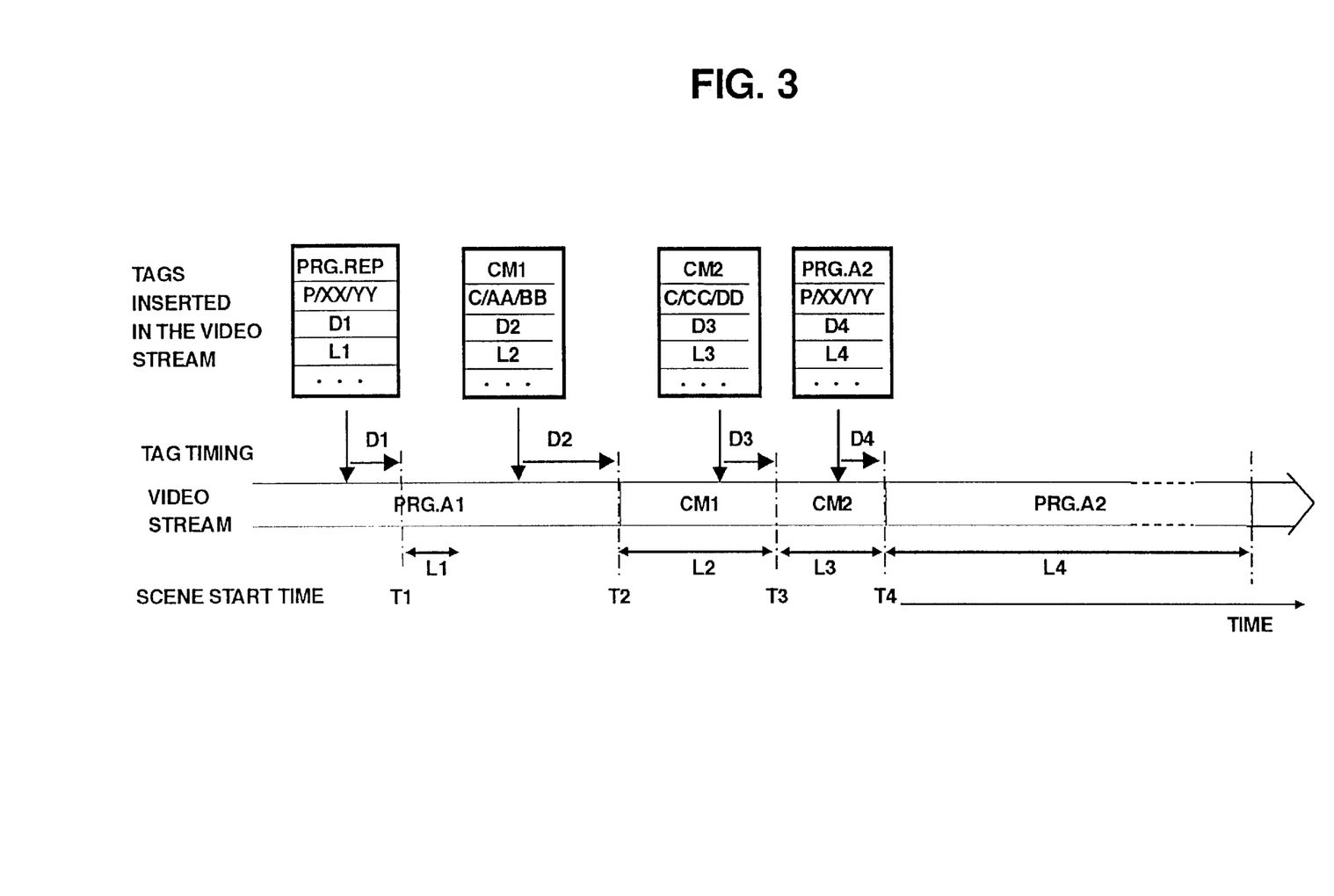
FIG. 3 is a diagram illustrating one way of sending tags and the way of identifying a video scene by using a tag.

FIG. 2 is a diagram showing an exemplary structure of a tag inserted in the video stream. FIG. 3 is a diagram illustrating the way of identifying a video scene by using a tag. In FIG. 2, a tag 1 at least comprises a scene ID (or title) 10 for the scene defined by the tag, a category 11 into which the scene defined by the tag is classified, a location 12 information used for finding the start time of the scene, and the length 13 of the scene.

The location 12 is preferably expressed by a time period that equals to the difference between the start time of the scene and the transmission time of the tag which precedes the scene start time. In other words, the tag has to be transmitted earlier than the scene start time by the period specified by the location 12 as shown in FIG. 3.

In FIG. 3, a tag with a scene ID of "PRG.REP" is transmitted D1 sec before a representative scene of a program segment "PRG.A1" whose period of time is L1 sec. Tags "CM1" and "CM2" are transmitted D2 and D3 sec before commercials CM1 and CM2 whose length are L2 and L3 sec, respectively. A tag with a scene ID of "PRG.A2" is transmitted D4 sec before a program segment "PRG.A2" whose length is L4 sec.

Alternatively, the interval between the scene start time and the tag transmission time (hereinafter referred to as "the offset interval") may be set to a fixed period of time, say, D sec. In this case, each tag has to be transmitted D sec before the scene associated with the tag; and the location 12 may be omitted.

Figure 4:
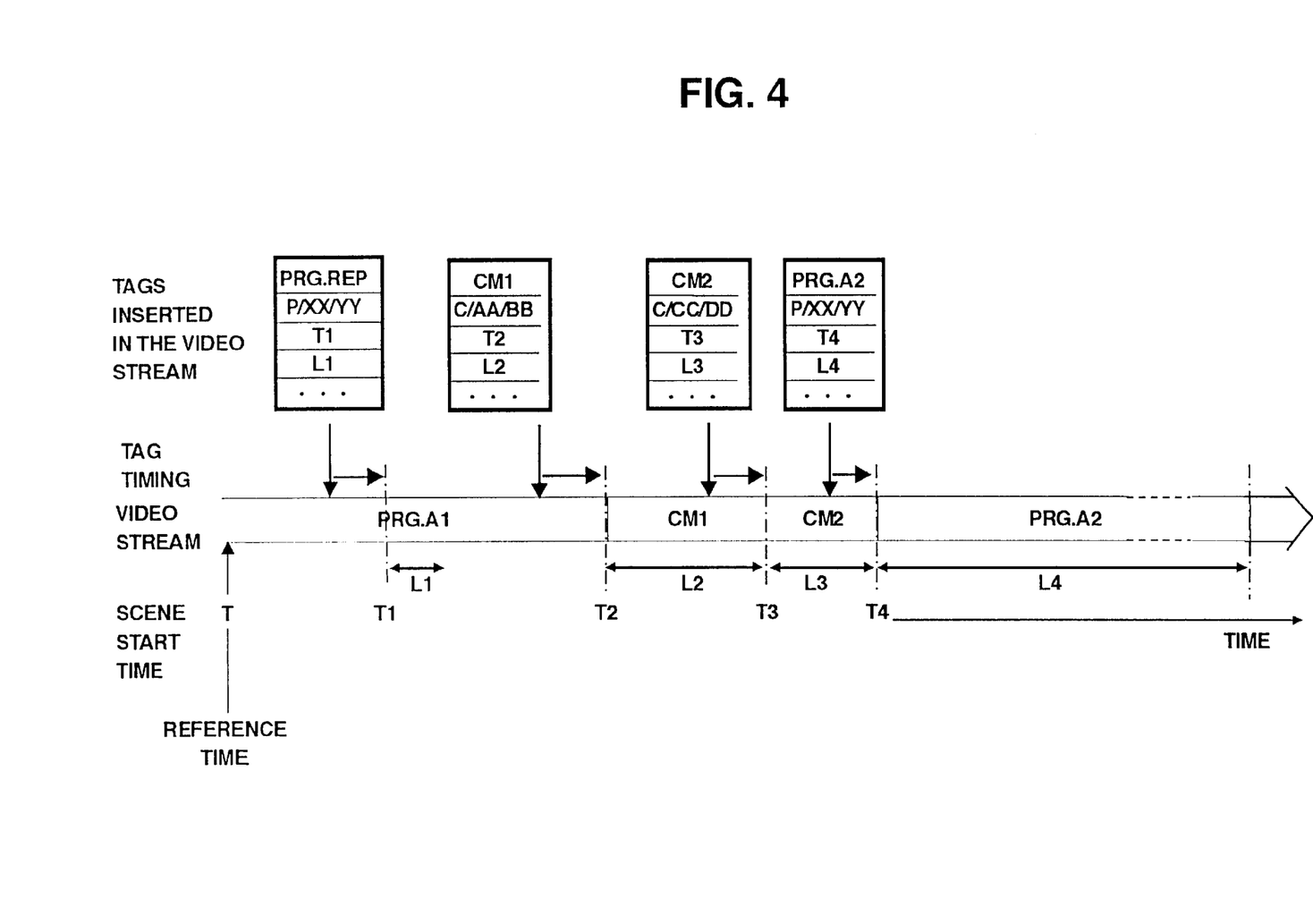
FIG. 4 is a diagram illustrating another way of sending tags.

It is noted that the value of the location field 12 of a tag may be expressed as the scene start time Ti measured from a reference time T set in the video stream as shown in FIG. 4 instead of using the interval between the scene start time and the tag transmission time (Di in FIG. 3).

Five inventive techniques for attaching a tag to a desired video scene so as to prevent the tags from being used for commercial cutting will be described in the following.

Removing the Length Information from Tag (Embodiment I)

Figure 5:
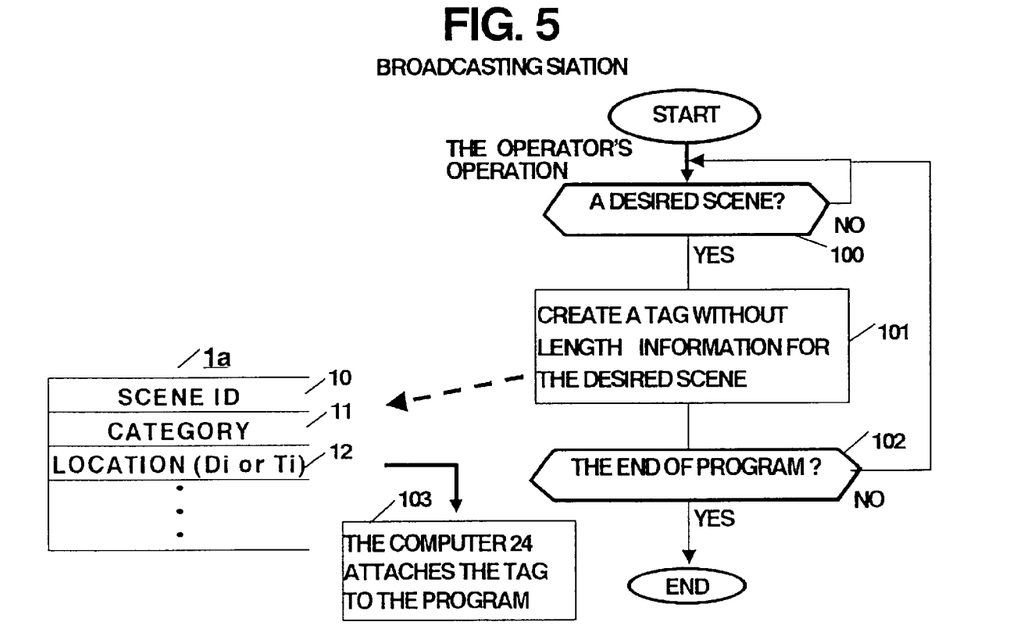
FIG. 5 shows an exemplary tag created and an exemplary tag-attaching operation executed in a TV system 1 that uses tags without length information in accordance with the principles of the invention

FIG. 5 shows an exemplary tag created and an exemplary tag-attaching operation executed in a TV system 1 that uses tags without length information in accordance with the principles of the invention. In FIG. 5, the operator searches a completed TV program (or a TV program which has been edited and compiled with commercials of the sponsors to the TV program and which is ready for transmission) and finds a desired scene in step 100. The operator creates a tag 1a without length information 13 for the found scene in step 101. The operator makes a test in step 102 to see if the end of the program is reached. If not, the operator returns to step 100. If the end of the program has been reached in step 102, then the operator ends the operation.

It is noted that in response to a creation of a tag in step 101, the computer 24 automatically inserts the created tag in an appropriate position in the TV program in a timing as shown in FIG. 3 or 4 in step 103. The insertion of tags are achieved either by blanking interval multiplexing in case of analog TV system or by time-division multiplexing in case of digital TV system.

If the user desires to utilize the video scene or clip collection function, the user is asked which category of information he or she wants. For this purpose, the broadcasting facility operator preferably sends a category list from which the user is permitted to select a category; the controller 48 stores the category list either in the pass storage device 47 or in an nonvolatile memory within the controller 48; and in response to a request from the user, the controller 48 may display the category list on the display device included in the video & audio output devices 45. Alternatively, a message "the category of this scene is 'CAR'" may be included in the corresponding scene. This enables the user to know a key word to use for the selection of category, permitting the user to collect information on the car thereafter. Once the user issues a clip collecting command specifying a desired category, the controller 48 keeps collecting and accumulating the video scenes with the tags whose category is CAR in the mass storage device 47 till the user issues another command to terminate the clip collection function.

Figure 6:
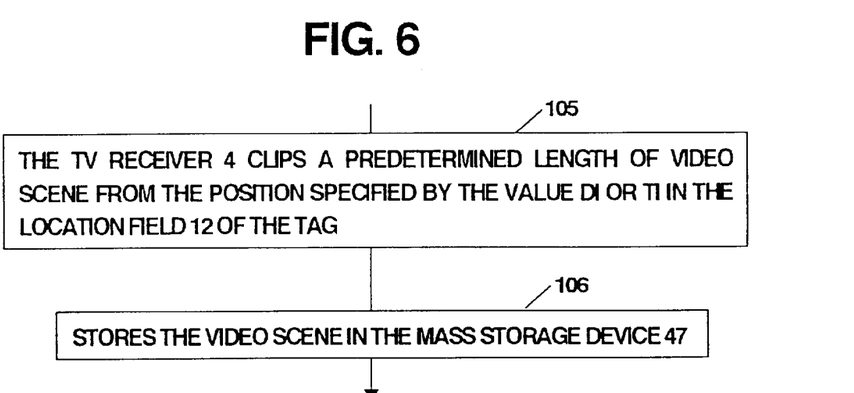
FIG. 6 is a flow chart showing an operation executed by the computer 24 in response to a creation of a tag in accordance with the principles of the invention.

In this embodiment, the TV receiver 4 clips a predetermined length of video scene from the position specified by the value Di or Ti in the location field 12 in step 105 and stores the clipped video scene in the mass storage device 47 in step 106 as shown in FIG. 6. Since the duration or time period of commercials has been standardized into some period, the predetermined length is preferably set to the largest one of the standard periods. Doing this enables each of the tagged video scenes of a specified category to be clipped in the maximum standardized length which is equal to or longer than the real length of the video scene.

It should be noted that the permission of tagging commercials is solely determined by the sponsor. In other words, a tag should not be attached to a commercial as long as the sponsor of the commercial does not permit the tagging to the commercial.

If this kind of tags were used for commercial cutting of a TV program, some of the tagged scenes might be clipped too much from the TV program. It is assumed that in order to cut the commercials, the user tries to remove all of the tagged scenes. Then, some of the commercials would remain unclipped at all because the tagging is not permitted to those commercials. Further, some portions of the program which are other than commercial might be clipped against the user's will if tags were attached to such portions. These will result in a defective TV program so defective as to be unbearable to watch. Thus, removing the length information from tag provides us with a simplest but effective tagging technique that is unusable to commercial cutting.

Using Counterfeit Tags (Embodiment II)

In this embodiment, the operator creates a normal tag 1 as shown in FIG. 2 for each of the desired video scenes.

Figure 7:
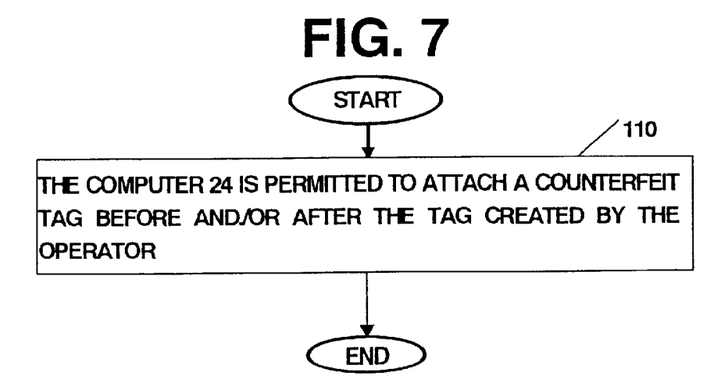
FIG. 7 is a flow chart showing an operation executed by the computer 24 in response to a creation of a tag in accordance with the principles of the invention.
Figure 8:
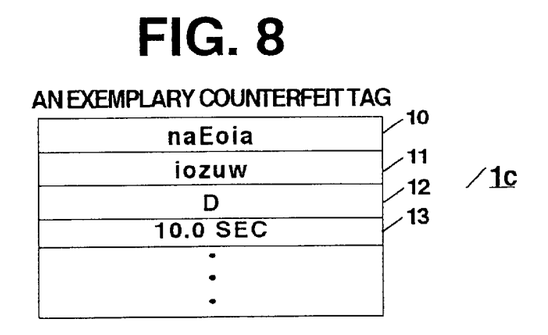
FIG. 8 is a diagram showing an exemplary counterfeit tag created in a second illustrative embodiment.

FIG. 7 is a flow chart showing an operation executed by the computer 24 in response to a creation of a tag in accordance with the principles of the invention. In response to a creation of a tag by the operator, the computer 24 is permitted to attach a counterfeit tag 1c as shown in FIG. 8 before and./or after the tag created by the operator. In FIG. 8, the scene ID field 10 and the category field 11 of counterfeit tag 1c have values that make no sense. Though the offset interval of the offset interval is set to D sec, the location fields 12 may be eliminated from the tags 1 if the locations 12 are set to D in all of the tags 1.

The operation of the TV receiver 4 is the same as in case of the first embodiment. That is, once the user issues a clip collecting command specifying a desired category, the controller 48 keeps collecting and accumulating the video scenes with the tags with the specified category in the mass storage device 47 till the user issues another command to terminate the clip collection function.

However, if the tags were used for commercial cutting, this results in the cutting of scenes tagged with the counterfeit tags as well as scenes tagged with tags attached by the operator, yielding a defective TV program.

It should be noted that the broadcasting party should not use a key word "commercial" or any identical key word for the category fields 11 associated with commercials. This would permit the user or a designer of the TV receiver 4 to easily discriminate the commercial scenes from other scenes.

Secret-key Encrypting of a Part of Tag (Embodiment III)

In this embodiment, any of the category 11, the location 12, and the length 13 fields of a tag is encoded through a first one way function (or encrypted with a secret key) in the computer 24 of the broadcasting facilities 2; and the encoded or encrypted value is decoded through a second one way function (or decrypted with the same secret key) in the TV receiver 4. A one-way function is such that the function can be evaluated efficiently, but its inverse cannot be evaluated. That is, for almost all images, it is infeasible to compute any preimage.

Figure 9:
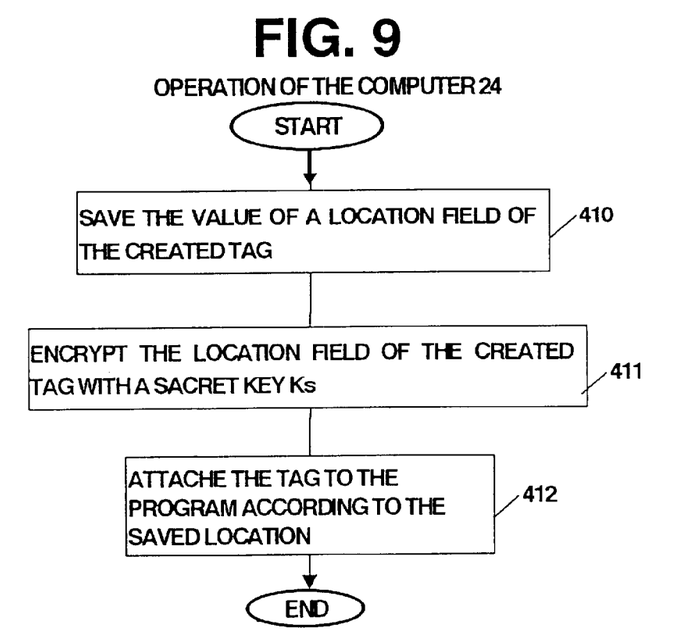
FIG. 9 is a flow chart showing an exemplary operation executed by the computer 24 in responsive to a creation of a tag in accordance with a third illustrative embodiment of the invention.

In this embodiment, the operator creates a normal tag 1 for a desired video scene. Responsively, the computer 24 operates as shown in FIG. 9 instead of executing the step 103 of FIG. 5. In FIG. 9, the computer 24 saves the value of a predetermined field, say, the location field of the created tag in step 410. In step 411, the computer 24 encrypts (or encodes) the predetermined field (the location field 12 in this example) of the created tag with a secret key Ks (with a first one-way function). In step 412 the computer attaches the encrypted (or encoded) tag to the program according to the saved value (the location 12 in this case). It is noted that if the encrypted or encoded field is not the location 12 field, there is no need of storing the value of the encrypted or encoded field and accordingly the step 410 can be omitted.

As seen from the above, the expression "encode X through a first one-way function into an encrypted X" means "encrypt X with a secret key into an encrypted X." The expression "decode the encoded X through a second one-way function into X" means "decrypt the encrypted X with the same secret key into the original X."

Figure 10:
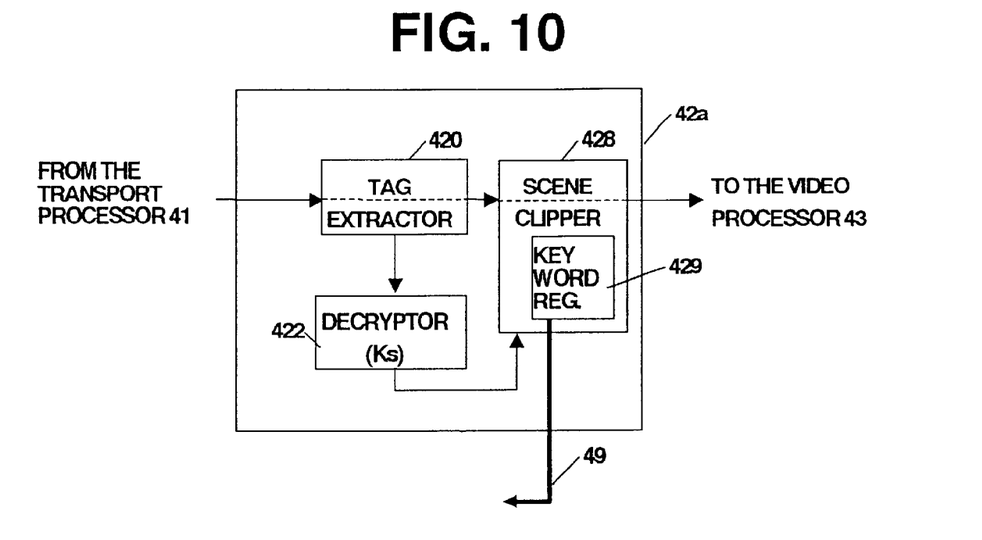
FIG. 10 is a diagram showing an arrangement of a video stream processor 42a used in place of the corresponding processor 42 of FIG. 1 in the third embodiment.

FIG. 10 is a diagram showing an arrangement of a video stream processor 42a used in place of the corresponding processor 42 of FIG. 1 in the third embodiment. The video stream processor 42a comprises a tag extractor 420 disposed in the video stream path from the transport processor 41; a decryptor or decoder 422 connected with the output of the tag extractor 420; and a scene clipper 428 disposed in the video stream path from the tag extractor 420 and connected with a decryptor 422 output and the bus 49. The scene clipper 428 has a key word register (KEY WORD REG.) 429.

In operation, if the user issues a clip collecting command specifying a desired key word, the key word is registered in the key word register 429 within the scene clipper 428. If the tag extractor 420 detects a tag, the extractor 420 extracts the value from the location 12 field of the tag and passes to the decryptor 422. The decryptor 422 decrypts the received value, i.e., an encrypted location with the same secret key as used in the encryption by the computer 24 into a decoded location value, which is passed to the scene clipper 428. The scene clipper 428 compares the value of the category field 11 with the value in the key word register 429. If the values coincides with each other, the scene clipper 428 clips the portion of a length defined by the length field 13 after the location value from the decryptor 422 has been passed after the detection of the tag. The clipped scene is stored by the controller 48 in the mass storage device 47. If the two values are not the same, the scene clipper 428 does nothing for the tag.

Thus the video scenes of the specified category (or the category specified by the key word) are collected and stored in the mass storage device 47.

It is noted that though the decryption may be achieved by software, it is preferable to do the decryption by hardware, especially by an integrated circuit. Doing this causes the secret key used for the decryption to be hardly leaked.

In the above example, the location field 13 has been encrypted, any other field may be encrypted. However, any of the category 11, the location 12, and the length 13 fields of the tag is preferably encrypted. The above-mentioned encryption is achieved by using any suitable one way function.

Using a Concealed Category Information (Embodiment IV)

The above-described embodiment has encrypted the value of any desirable field in the broadcasting party 2, and the receiver 4 has decrypted the encrypted value into the original value. In stead of doing this, the broadcasting party 2 encrypts the value of the category field 11 with a secret key; the receiver 4 also encrypts the key word specified by the user with the same secret key as used in the encryption in the broadcasting party 2; and the receiver 4 collects and stores only the scenes associated with the tags whose category field 11 has the value that coincides with the encrypted key word.

The operation of the computer is the same as in the just-described embodiment, and accordingly omitted.

Figure 11:
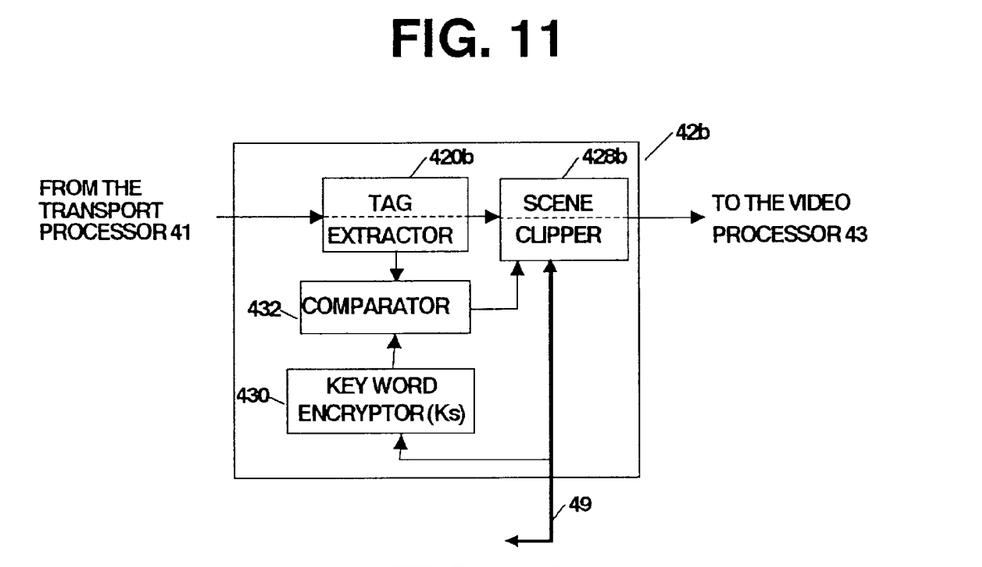
FIG. 11 is a diagram showing an arrangement of a video stream processor 42b used in place of the corresponding processor 42 of FIG. 1 in the fourth embodiment.

FIG. 11 is a diagram showing an arrangement of a video stream processor 42b used in place of the corresponding processor 42 of FIG. 1 in the fourth embodiment of the invention. In FIG. I1, the video stream processor 42b comprises a tag extractor 420b disposed in the video stream path from the transport processor 41 for extracting the value of the category field 11 of a detected tag; an encryptor 430 for encrypting a key word received from the controller 48 into an encrypted key word; a comparator 432 for comparing the value from the tag extractor 420b with the encrypted key word; and a scene clipper 428b disposed in the video stream path from the tag extractor 420b and connected with the comparator 432 output and the bus 49.

In operation, if the user issues a clip collecting command specifying a desired key word, the controller 48 sends the key word to the key word encryptor of the video stream processor 42b. The key word encryptor 430 encrypts the key word with the same secret key as used in the encryption by the computer 24 into an encrypted key word. The tag extractor 420b extracts the value of the category field 11 from a detected tag and pass the extracted value to the comparator 432. The comparator 432 compares the extracted value with the encrypted key word from the key word encryptor 430 to provide a flag indicative of whether the comparison is successful. If the flag is logical 1, the scene clipper clips the portion of a length defined by the length field 13 after the value of the location field 12 of the detected tag has been passed after the detection of the tag. The clipped scene is stored by the controller 48 in the mass storage device 47. If the flag from the comparator 432 is logical zero, then the scene clipper 428b does nothing for the tag.

Thus the video scenes of the specified category (or the category specified by the key word) are collected and stored in the mass storage device 47.

Though the encryption is preferably achieved by hardware, it is possible to execute the encryption by software. In order to achieve this, the key word encryptor 430 has to be replaced with an encrypted key word register for storing an encrypted version of the key word specified by the user. Further, if the user issues a clip collecting command specifying a desired key word, the controller 48 first encrypts the key word with the same secret key as used in the encryption in the computer 24, and sends the encrypted key word to the encrypted key word register within the video stream processor 42b.

Since there is no way of discriminating the tags for commercial scenes from the tags for the other scenes, using the tags of this embodiment will result in the cutting of all the tagged scenes, yielding a very defective TV program.
Transmitting a Category vs. Encoded Category Table (Embodiment V)

Figure 12:
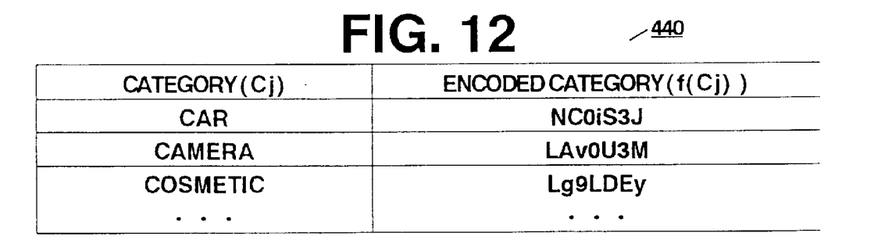
FIG. 12 is an exemplary category vs. encoded category table transmitted from the broadcasting party 2 to the TV receiver 4.

In the just described embodiment, the TV receiver 4 may use a category-encoded category table transmitted from the broadcasting party 2 instead of encoding the key word specified by the user. If encoding a category Cj (j=1, 2, 3 . . . N) through a one-way function f provides an encoded category f(Cj), the category-encoded category table 440 is expressed as shown in FIG. 12. In FIG. 12, it is assumed that for example:

f(CAR)=NC0iS3J f(CAMERA)=LA0U3M f(COSMETIC)=Lig9LDEy and so on.

Figure 13:
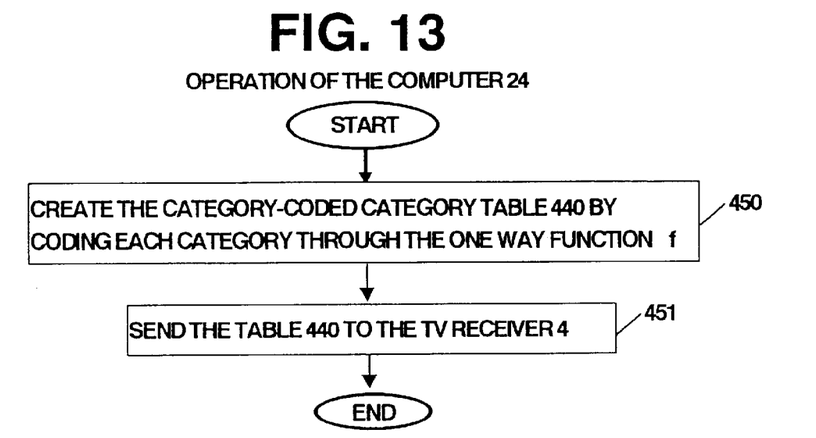
FIG. 13 is a diagram showing an operation of preparing the category-encoded category table 440 in accordance with the principles of the invention.

FIG. 13 is a diagram showing an operation of preparing the category-encoded category table 440 in accordance with the principles of the invention. In step 450, the operator makes a list of categories C1, C2, . . . CN, and the computer 24 responsively creates the category-encoded category table 440 by encoding each of the categories in the list. In step 451, the computer 24 sends the category-encoded category table 440 to the TV receiver 4 and ends the operation.

Figure 14:
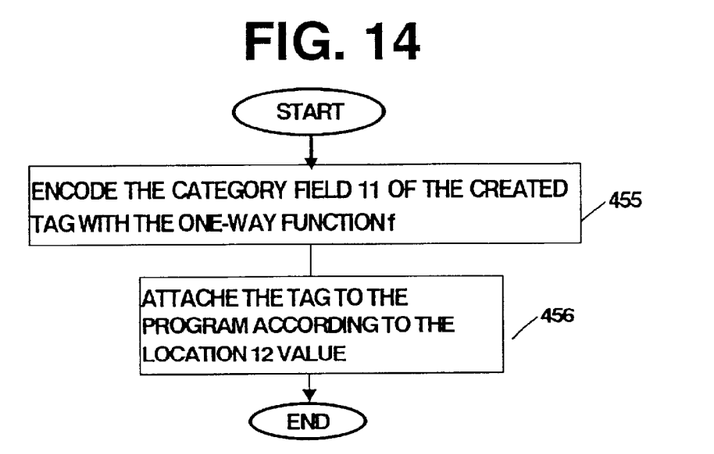
FIG. 14 is a flow chart showing an exemplary operation executed by the computer 24 in responsive to a creation of a tag in accordance with a fifth illustrative embodiment of the invention.

FIG. 14 is a flow chart showing an exemplary operation executed by the computer 24 in responsive to a creation of a tag in accordance with a fifth illustrative embodiment of the invention. In FIG. 14, the computer 24 encodes the category field 11 of the created tag with the one-way function in step 455. In step 456, the computer 24 attaches the tag to the program according to the location 12 value.

Figure 15:
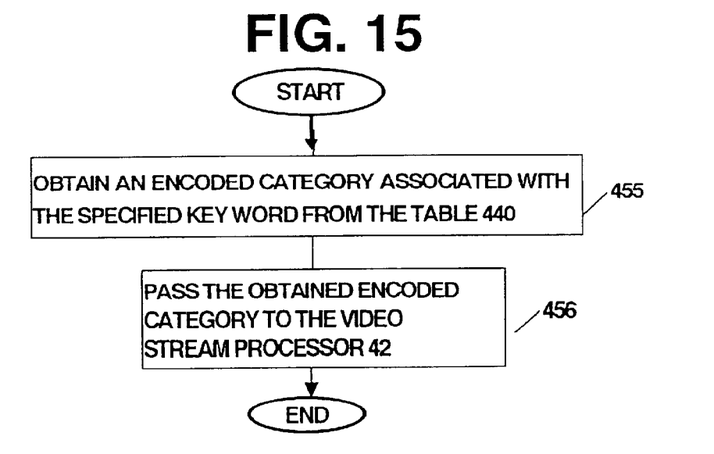
FIG. 15 is a flow chart showing an operation executed by the controller 48 in response to a reception of the clip collection command with a category specified.

FIG. 15 is a flow chart showing an operation executed by the controller 48 in response to a reception of the clip collection command issued with a category specified. In response to the reception of the clip collection command, the controller 48 obtains an encoded category associated with the specified key Cj word from the table 440 in step 455. In step 456, the controller 48 passes the obtained encoded category f(Cj) to the video stream processor 42 and ends the operation. Responsively, if the value of the encrypted category field (not shown) of the detected tag coincides with the received encoded category f(Cj) from the controller 48, the video stream processor 42 clips the length specified by the length 13 field after the period specified by the location 12 field of the detected tag has been elapsed after the detection of the tag. Otherwise, the video stream processor 42 does nothing for the tag.

In this way, the above-described operation is repeated till the user issues a collection termination command without letting the user know the category of any tag. An attempt to cut commercials or indiscriminate tagged scene cutting will result in a defective program.

The fifth embodiment, which executes encoding or encryption in only one element: i.e., the computer 24 within the broadcasting facilities 2 is more robust to key attacks than the fourth embodiment, which executes encoding in every station: i.e., the computer 24 within the broadcasting facilities 2 and the video stream processor 42 or the controller 48 within each TV receiver. ps Using a Syndrome as a One Way Function f (Embodiment VI)

If a category Cj is expressed in a binary code, the binary-coded category is considered to be a linear code. Assuming the binary code of Cj to be B-bits long, the binary code of Cj is a B-dimension vector or a (1, B) matrix and accordingly denoted with a bold type like Cj. Then, for such a linear code Cj, there exists a parity check matrix H that satisfies:

$$Cj^T H = 0, \ldots \quad (1)$$

where $A^T$ is a transposed matrix of a matrix A.

For an error vector (i.e., an arbitrary vector) e, letting $Cj+e=y_j$, an expression $s_j=y_j^T H$ is called a syndrome of the received symbol $y_j$ (This is on the assumption that Cj has changed to $y_j$ due to an error e during transmission). From equation (1), $$S_j = (Cj+e)^T H = e^T H.$$

In other words, the syndrome of the sum of the category Cj and an arbitrary vector X (hereinafter, X is used in place of e), i.e., $(Cj+X)^T H$ (H is a parity check matrix for Cj) is equal to $X^T H$, which is independent of the value of the category Cj.

In a preferred embodiment, the following function:

$$s(Cj) = (Cj+X)^T H$$

$$= X^T H \ldots \quad (2)$$

is used as an above-mentioned one-way function f

Figure 16:
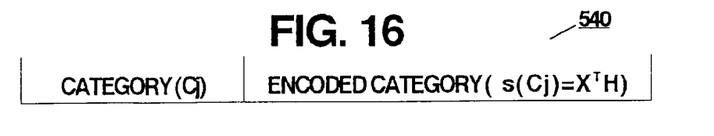
FIG. 16 is an exemplary category vs. encoded category table transmitted from the broadcasting party 2 to the TV receiver 4 in a sixth embodiment of the invention.
Figure 17:
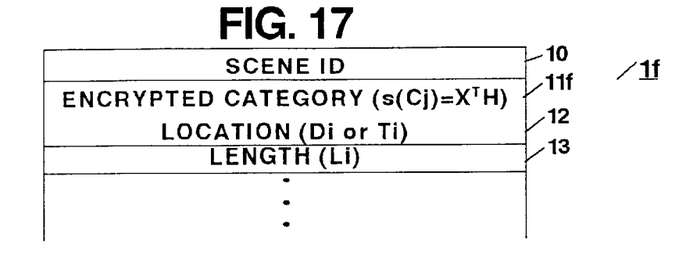
FIG. 17 is a diagram showing an exemplary tag containing a syndrome in the coded or encrypted category field.

In this specific embodiment, the category vs. encoded category table 540 is defined as shown in FIG. 16. In this table, the encoded category field contains $s(Cj)=X^T H$ (H is a parity check matrix for Cj). Also, each tag is defined as shown in FIG. 17. In FIG. 17, the encoded category field 11f contains $s(Cj)=X^T H$ (H is a parity check matrix for Cj). By using the table 540, the tags of the category specified by the user can be selected in the same manner as in the fifth embodiment.

The above defined function s has two interesting properties.

It should be first noted that using different values of X for an identical category enables each category Cj to have a plurality of values $Xj,k^T Hj,k$ (k=1, 2, ..., Hj is a parity check matrix for Cj). It is possible to express subcategories of Cj by respective quantities Xj,k.

Figure 18:
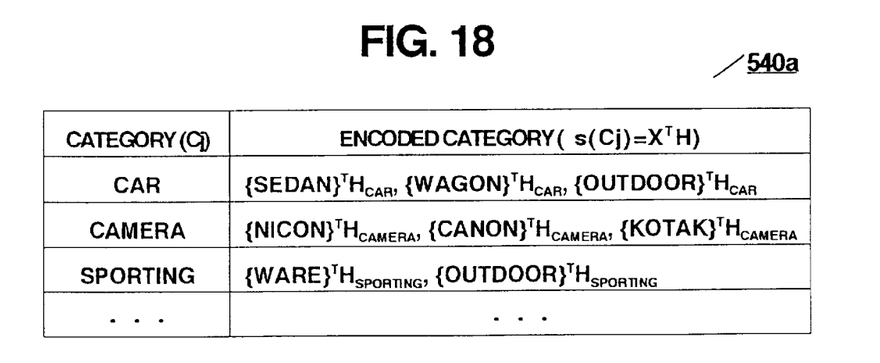
FIG. 18 is a diagram showing an exemplary category vs. encoded category table.

FIG. 18 is a diagram showing an exemplary category vs. encoded category table 540a in which each category is permitted to have a plurality of values (these values may be used to express subcategories). In FIG. 18, {xxxx} is a binary code expression of a character string "xxxx". Hcar, Hcamera and Hsporting are the parity check matrices for {car} and {camera}, {sporting} respectively. In this way, each category Cj is subdivided into subcategories Xj,k.

Figures 19, 20:
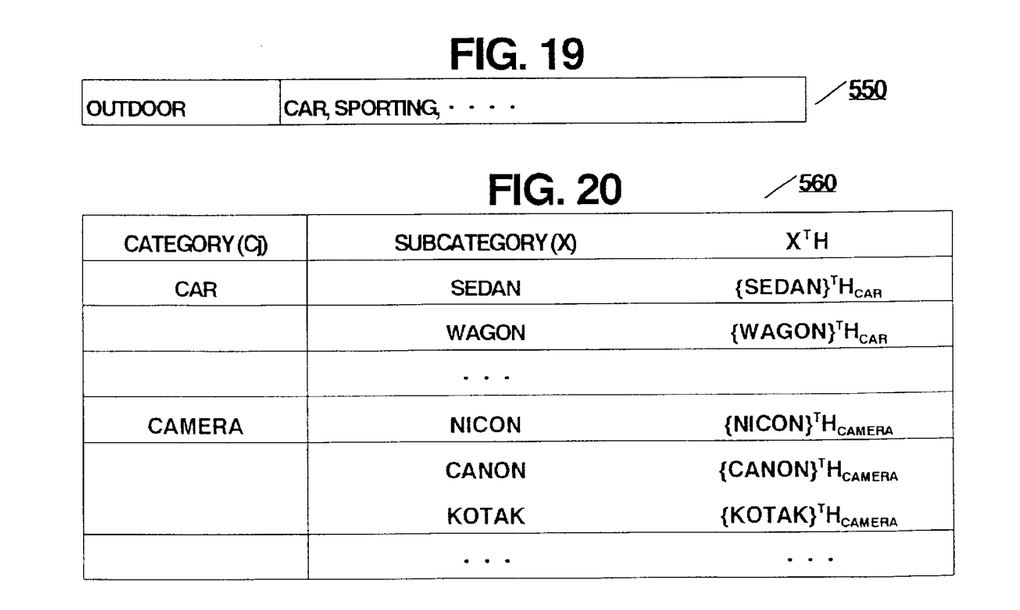
FIG. 19 is a diagram showing an example of a category list for a super-category "outdoor"
FIG. 20 is a diagram showing a table comprising a category, subcategories of the category, and corresponding syndromes.

It should be also noted that a super-category which includes a plurality of categories is created by combining an identical quantity Xk with different categories. In order to achieve this, a list of categories that the super-category should include is made as shown in FIG. 19. In FIG. 19, a super-category "outdoor" includes categories "car", "sporting", and so on. Then a syndrome for each listed categories: e.g., $\{outdoor\}^T Hcar$, $\{outdoor\}^T Hsporting$, etc. is calculated.

Though the encoded category field of the table 540a contains expressions like $\{SEDAN\}^T H_{CAR}$, the encoded category field actually contains binary codes. For this reason, it is preferable for the broadcasting side 2 to have a table that has the fields for a category (Cj), a subcategory (X), and the encoded category $X^T H$ as shown in FIG. 20.

The table 540a of FIG. 18 is transmitted from the broadcasting side 2 to the TV receivers 4 in advance. If subcategories and super-categories are to be used, The tables 550 and 560 of FIGS. 19 and 20 are preferably transmitted from the broadcasting side 2 to the TV receivers 4 in advance.

Many widely different embodiments of the present invention may be constructed without departing from the spirit and scope of the present invention. It should be understood that the present invention is not limited to the specific embodiments described in the specification, except as defined in the appended claims.

What is claimed is:

1. In a television broadcasting system wherein a first station transmits a video stream to second stations, a method, for use in the first station, of permitting a second stations to extract a scene within the video stream, the method comprising the steps of:

generating a tag for said scene, said tag including: a category of said scene, identifying a beginning of said scene and a length of said scene;

preventing said tag from being used to identify a location for commercial cutting; and inserting said tag in said video stream at a position associated with said beginning of said scene.

2. A method as defined in claim 1, further comprising removing said length from said tag.

3. A method as defined in claim 1, further comprising inserting at least one counterfeit tag, including false data, in said video stream.

4. A method as defined in claim 1, further comprising:

encoding one of said category, said location and said length through a one-way function; and using said encoded material.

5. In a television broadcasting system comprising transmitting a video stream from a first station to second stations, a method, for use in a second station, of identifying a scene within the video stream, the method comprising the steps of:

obtaining from a user a category of scenes that the user desires;

detecting a tag associated with said scene that is in said video stream, said tag including a category of said scene, a location of a beginning of said scene and a length of said scene, wherein said tag comprises means to prevent said tag from being used for commercial cutting; and if said category incorporated in said tag coincides with said desired category, extracting from said video stream a part of a length of said video stream, defined by the length of said scene.

6. A method as defined in claim 5, further comprising clipping from said video stream a part of a largest one of a plurality of standardized lengths.

7. A method as defined in claim 5, further comprising;

encoding one of said category, said location or said length with a one-way function, clipping from said video stream a part of said length, decoding one of said category, location or length into decoded material; and using said decoded material.

8. A method as defined in claim 2, further comprising:

encoding said category into an encoded category through a one-way function;

using said encoded category in place of said category; and for each of a plurality of possible categories, sending a set of said category and said encoded category to said second stations before inserting said tag in said video stream.

9. A method as defined in claim 8, wherein said encoded category is a syndrome of a combination of said category and a parameter.

10. A method as defined in claim 9, further comprising the steps of:

making a list of subcategories for a desired one of possible categories;

find a syndrome for a combination of said desired category and each of said subcategories by using each of said subcategories as said parameter;

send a table of said category, said subcategories, and corresponding syndromes to said second stations; and using said syndromes as said encoded categories.

11. A method as defined in claim 9, further comprising the steps of:

creating a super-category comprising a list of categories;

find a syndrome for a combination of said super-category and each of said list of categories by using each of said list of categories as said parameter;

send said list for said super-category to said second stations; and using said syndromes as said encoded categories.

12. A method as defined in claim 5, further comprising;

encoding said category of said detected tag into an encoded category using a one-way function, and clipping from said video stream a part of a length, wherein said clipping comprises the steps of:

receiving a set of said category and said encoded category for each of a plurality of possible categories; and if said category of said detected tag coincides with said encoded category associated by said set with said desired category, clipping from said video stream said part of said length.

13. A method as defined in claim 12, wherein said encoded category is a syndrome of a combination of said category and a parameter.

14. A method as defined in claim 13, further comprising the step of:

receiving a table of said category, subcategories of said category and corresponding syndromes from said first station; and using said syndromes as said encoded categories and using said subcategories as said categories.

15. A method as defined in claim 13, further comprising the step of:

receiving a super-category list comprising a list of categories from said first station; and using said syndromes as said encoded categories and using said super-category as one of said categories.

16. A system, within a first station in a television broadcasting system, for permitting a second station to extract a scene from within a video stream being broadcast from the first station, the system comprising:

means for generating a tag for said scene, said tag including a category of said scene, means for locating a beginning of said scene and a length of said scene;

means for preventing said tag from being used for commercial cutting; and means for inserting said tag in said video stream at the position associated with said scene beginning.

17. A system as defined in claim 16, further comprising:

means for encoding said category into an encoded category through a one-way function;

means for using said encoded category in place of said category; and means for sending a set of said category and encoded category, for each of a plurality of possible categories, to said second station(s) before inserting said tag in said video stream.

18. A system as defined in claim 16, wherein said category is a syndrome of a combination of said category and a parameter.

19. A system as defined in claim 18, her comprising:

means for making a list of subcategories for a desired one of possible categories;

means for finding a syndrome for a combination of said desired category and each of said subcategories by using each of said subcategories as said parameter;

means for sending a table of said category, said subcategories, and corresponding syndromes to said second station(s); and means for using said syndromes as said categories.

20. A system as defined in claim 18, further comprising:

means for creating a super-category comprising a list of categories;

means for finding a syndrome for a combination of said super-category and each of said list of categories by using each of said list of categories as said parameter;

means for sending said list for said super-category to said second station(s); and means for using said syndromes as said categories.

21. A system as defined in claim 16, wherein said category is a syndrome of a combination of said category and a parameter.

22. A system as defined in claim 21, further comprising:

means for receiving a table of said category, subcategories of said category and corresponding syndromes from said first station; and means for using said syndromes as said encoded categories and using said subcategories as said categories.

23. A system as defined in claim 21, further comprising:

means for receiving a super-category list comprising a list of categories from said first station; and means for using said syndromes as said encoded categories and using said super-category as one of said categories.

24. In a television broadcasting system wherein a first station transmits a video stream to second stations, a system, within at least one second station, for extracting a scene within said video stream from the first station, the system comprising:

means for obtaining from a user a category of scenes that the user desires;

means for detecting at least one tag in said video stream, said tag including a category of said scene, means for locating a beginning of said scene and a length of said scene, wherein said tag is adapted to prevent said tag front being used for commercial cutting; and means, responsive to a determination that said category included in said tag coincides with said desired category, for extracting, from said video stream a part of a length of the video stream defined by said length of said scene starting from a beginning of said scene.

25. A system as defined in claim 24, wherein said category of said detected tag has been encoded into an encoded category with a one-way function, and further comprising:

means for clipping a part of said length from said video stream:

means for receiving a set of said category and said encoded category for each of a plurality of possible categories; and means, responsive to a determination that said category of said detected tag coincides with said encoded category associated by said set with said desired category, for clipping said part from said video stream.

* * * * *